United States Patent
Chong et al.

(10) Patent No.: US 7,078,677 B2
(45) Date of Patent: Jul. 18, 2006

(54) OPTICAL ENCODER DISK HAVING A REGION THAT CONTINUOUSLY INCREASES IN SIZE

(76) Inventors: Chee Keong Chong, 37 Tingkat Siakap 11, Seberang Jaya, 13700 Perai, Penang (MY); Chin Yun Lee, 62, Cangkat Bukit Gambir Dua, 11700 Gelugor, Penang (MY)

( * ) Notice: Subject to any disclaimer, the term of this patent is extended or adjusted under 35 U.S.C. 154(b) by 155 days.

(21) Appl. No.: 10/762,951

(22) Filed: Jan. 21, 2004

(65) Prior Publication Data
US 2005/0156104 A1 Jul. 21, 2005

(51) Int. Cl.
*G01D 5/34* (2006.01)

(52) U.S. Cl. .......................... 250/231.18; 250/231.14; 250/214 PR; 33/1 PT; 33/1 N; 356/616

(58) Field of Classification Search ........... 250/231.13, 250/231.14, 231.16, 231.18, 214 PR, 229, 250/237 R; 33/1 PT, 1 N; 356/616, 617
See application file for complete search history.

(56) References Cited

U.S. PATENT DOCUMENTS

| | | | |
|---|---|---|---|
| 5,428,217 A * | 6/1995 | Nakajima et al. | 250/214.1 |
| 5,650,613 A * | 7/1997 | Lewis | 250/231.18 |
| 5,734,160 A * | 3/1998 | Chung et al. | 250/231.13 |
| 6,170,162 B1 * | 1/2001 | Jacobsen et al. | 33/1 PT |
| 6,222,183 B1 * | 4/2001 | Taniguchi et al. | 250/231.13 |
| 6,552,330 B1 * | 4/2003 | Blasing | 250/231.13 |
| 6,822,220 B1 * | 11/2004 | Lesniak | 250/231.13 |
| 6,888,126 B1 * | 5/2005 | Blasing et al. | 250/231.13 |
| 2002/0179826 A1 * | 12/2002 | Laberge et al. | 250/231.18 |

* cited by examiner

Primary Examiner—Stephone B. Allen
Assistant Examiner—Davienne Monbleau (57) ABSTRACT

A code disk, an optical encoder using such a disk and a method thereof are described. The code disk includes a first region on the disk and a second region that is adjacent to the first region. The first region increases continuously in size in a radial direction from a minimum at a first angular position to a maximum that occurs 360 degrees from the first angular position. One of the first and second regions allows light to be transmitted therethrough to a detector, and the other of the first and second regions prevents light from being transmitted therethrough. The detector generates an output that corresponds to the amount of light transmitted through the code disk.

13 Claims, 7 Drawing Sheets

OPTICAL ENCODER DISK HAVING A REGION THAT CONTINUOUSLY INCREASES IN SIZE

FIELD

Embodiments of the present invention relate to optical encoders.

BACKGROUND

Figure 1:
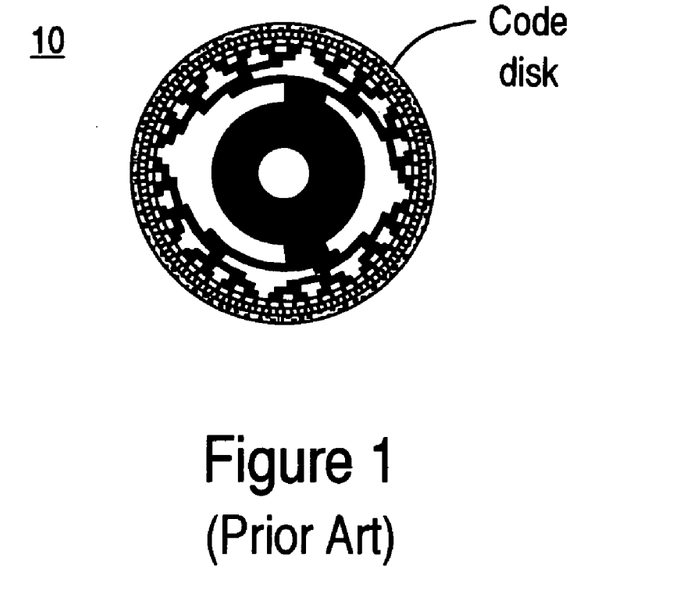
FIG. 1 illustrates a conventional code disk used by an optical encoder.

An optical encoder essentially consists of a code disk that includes a number of uniquely encoded tracks. An example of a conventional code disk is shown in FIG. 1. Code disk 10 includes eight uniquely encoded tracks (rings). Each track consists of various combinations of opaque and transparent locations, arranged so that there is a unique combination of opaque and transparent locations along a radius at each possible angular position of code disk 10.

Code disk 10 rotates in an assembly that also includes a light source and a number of photo-detectors. There is one photo-detector per track, and so in the example of FIG. 1 there would be eight photo-detectors. Light from the light source is directed onto code disk 10. A transparent region on code disk 10 allows light to reach a respective photo-detector while an opaque region prevents light from doing so. The photo-detectors will receive a unique pattern of light depending on the angular position of the code disk 10. Thus, the angular position of code disk 10 can be determined according to which pattern of light is received at the photo-detectors.

Code disk 10 can be used in a position indicating encoder or position feedback encoder to provide closed-loop feedback to a motor control system. For example, an optical encoder incorporating code disk 10 can be used with a robot arm to determine the angular position of the robot arm by reading the pattern of light transmitted by code disk 10. Importantly, this can be accomplished without the need to "home" the robot arm when it is first powered on. In other words, it is not necessary to have the robot arm move to a predefined starting position that provides a reference point for measuring subsequent movements of the arm. Instead, the unique light pattern produced at each angular position can be used to determine the position of the robot arm at any time without the need of a reference point.

The output of the photo-detectors can be used to produce a digital signal. The optical encoder of FIG. 1, with eight tracks on code disk 10 and eight photo-detectors, has a resolution of eight bits and can produce 256 different light or bit patterns per revolution.

One problem with conventional optical encoders is that they are fixed to a limited resolution. To increase resolution, the number of tracks needs to be increased, increasing the size of the code disk. Also, with more tracks, the number of corresponding photo-detectors needs to be increased. Increasing the size of the code disk and the number of photo-detectors will increase the cost of the optical encoder.

Therefore, an optical encoder that can achieve higher resolutions without necessarily increasing the size of the code disk or the number of photo-detectors would be advantageous.

SUMMARY

Embodiments of the present invention pertain to a code disk, an optical encoder using such a disk and a method thereof. The code disk includes a first region on the disk and a second region adjacent to the first region. The first region increases continuously in size in a radial direction from a minimum at a first angular position to a maximum that occurs 360 degrees from the first angular position. One of the first and second regions allows light to be transmitted therethrough to a detector, and the other of the first and second regions prevents light from being transmitted therethrough. The detector generates an output that corresponds to the amount of light transmitted through the code disk.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to various embodiments of the invention, examples of which are illustrated in the accompanying drawings. The drawings referred to in this description should not be understood as being drawn to scale except if specifically noted.

Figure 2:
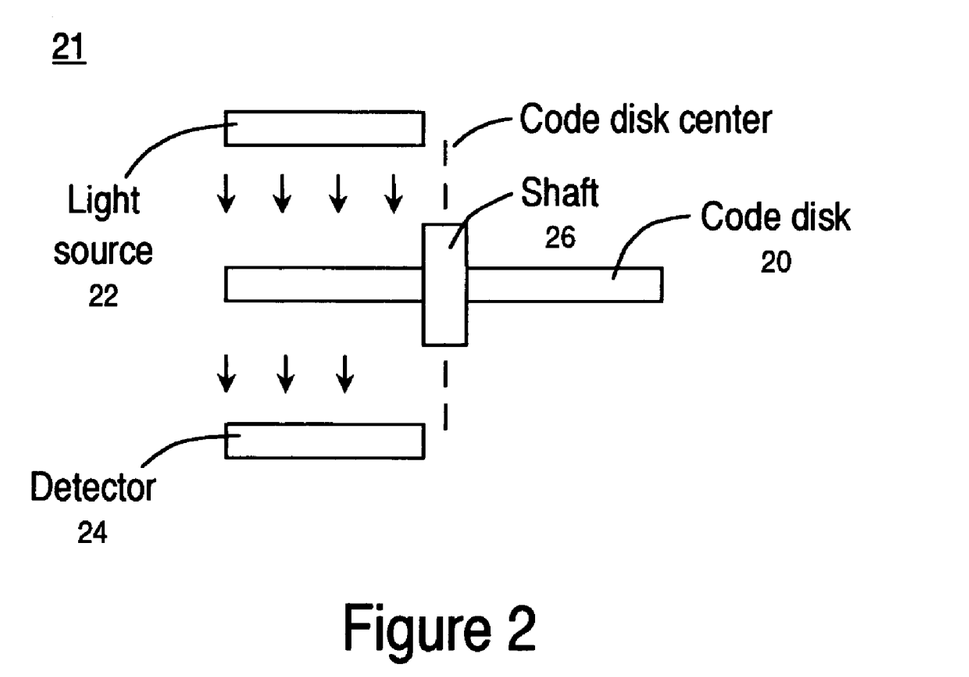
FIG. 2 is a cross-sectional view showing elements of an optical encoder according to one embodiment of the present invention.

FIG. 2 is a cross-sectional view showing elements of an optical encoder 21 according to one embodiment of the present invention. Optical encoder 21 can be used as a position indicator encoder or position feedback encoder to provide closed-loop feedback to a motor control system, for example.

In the present embodiment, optical encoder 21 includes a code disk 20, a light source 22, and a detector 24. In one embodiment, light source 22 is a light-emitting diode (LED). Alternatively, a number of LEDs may be used. Light sources other LEDs can also be used. In general, light source 22 can provide light that is substantially uniform and constant in intensity.

In general, detector 24 is a photo-sensitive or light-sensitive device. In one embodiment, detector 24 includes a photodiode. As will be seen, according to the various embodiments of the present invention, detector 24 can include more than one photodiode.

In general, optical encoder 21 permits relative movement to occur between code disk 20 and light source 22/detector 24. That is, code disk 20 can rotate relative to light source 22 and detector 24, and/or light source 22 and detector 24 can move relative to code disk 20. In one embodiment, code disk 20 is installed on a shaft 26 that allows the code disk 20 to rotate. Other means can be used to install code disk 20 in optical encoder 21.

As will be seen, code disk 20 includes a pattern that consists of essentially two types of regions: regions that allow light from light source 22 to be transmitted to detector 24, and complementary regions that prevent light from light source 22 from being transmitted to detector 24. In one embodiment, the former regions are transparent and the latter regions are opaque. Regions described as transparent may not be completely transparent, and regions described as opaque may not be completely opaque. In general, regions described as being transparent allow more light from light source 22 to reach detector 24 than regions described as being opaque.

The pattern on code disk 20 is such that there is a linear relationship between the amount of light reaching detector 24 and the angular position of code disk 20. In other words, at each angular position of code disk 20, a unique amount of light will reach detector 24. The angular position of code disk 20 refers to the amount of rotation of a point on code disk 20 relative to a reference point. The angular position can be measured in degrees or the equivalent.

In the present embodiment, light from light source 22 is directed onto the code disk 20. A lens may be used to collimate the light from light source 22. A certain amount of light from light source 22 will reach detector 24 through code disk 20. The amount of light reaching detector 24 depends on which part of the pattern on code disk 20 the light is shining through; hence, the amount of light reaching detector 24 depends on the angular position of code disk 20. In one embodiment, the amount of light reaching detector 24 is converted into a current or voltage. By measuring the magnitude of the current or voltage, the angular position of code disk 20 can be determined.

Figure 3:
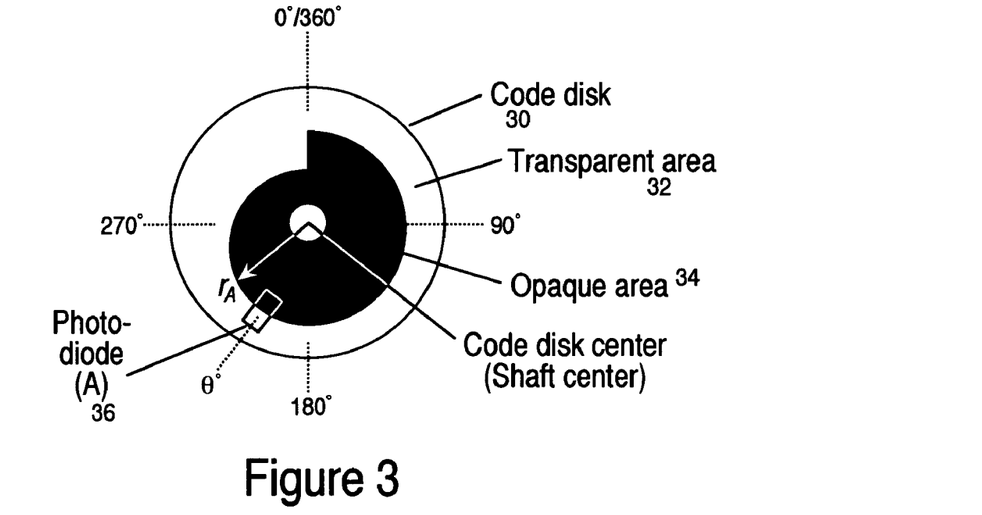
FIG. 3 illustrates a code disk with continuously scaled opaque and transparent regions according to one embodiment of the present invention.

FIG. 3 illustrates a code disk 30 with regions 32 and 34 according to one embodiment of the present invention. Regions 32 and 34 are described in FIG. 3 as being transparent and opaque, respectively. However, as mentioned above, regions 32 and 34 do not need to be absolutely transparent or absolutely opaque. In general, more light can be transmitted through region 32 than through region 34. Also, according to the embodiment illustrated in FIG. 3, the opaque region 34 encompasses the transparent region 32. Alternatively, region 34 could be transparent and region 32 could be opaque.

In the present embodiment, transparent region 32 and opaque region 34 are complementary to each other in shape and area, and transparent region 32 and opaque region 34 constitute the total area of code disk 30 (other than the area comprising the code disk center where the code disk is mounted on a shaft, for example). Thus, as opaque region 34 increases in size (area), transparent region 32 decreases in size and vice versa.

Region 34 can be described as being cam-like in shape. In one embodiment, regions 32 and 34 are "continuously scaled" or "linearly scaled." That is, the area of region 34 increases in size in the radial direction in a non-discontinuous and linear fashion from a minimum at a first angular position (designated in FIG. 3 as zero degrees) to a maximum that is 360 degrees (°) from the first angular position.

The line segment $r_A$ is the radius of region 34 as a function of angular position. The length of the line segment $r_A$ increases in a linear (continuous) fashion from a minimum at a first angular position (e.g., zero degrees) to a maximum that is 360° from the first angular position. Thus, the radius $r_A$ of region 34 is defined as:

$$r_A = r_0 - m \cdot \theta, \tag{1}$$

where $r_0$ is the prime radius at zero degrees (0°), m is a constant, and $\theta$ is the angular position of code disk 30. Equation (1) can be rearranged so that the angular position is written as a function of $r_A$:

$$\theta = (r_A - r_0)/m. \tag{2}$$

As $r_0$ and m are constant values, the angular position of the code disk 30 can be determined as a function of the value of $r_A$.

According to the embodiment of FIG. 3, a photodiode (A) 36 is superimposed over code disk 30. A single photodiode is described; however, a set of photodiodes can also be used. Photodiode 36 is positioned so that it overlaps the boundary of regions 32 and 34. As code disk 30 is rotated either clockwise or counterclockwise, more or less of photodiode 36 will be exposed to light. For light that is uniform and constant in intensity, the output of the photodiode 36 will increase or decrease proportionally as more or less of the area of photodiode 36 is exposed to light. The amount of light received by photodiode 36 depends on the angular position of code disk 30; therefore, the angular position of code disk 30 can be determined by measuring the amount of light received at photodiode 36.

Figure 4:
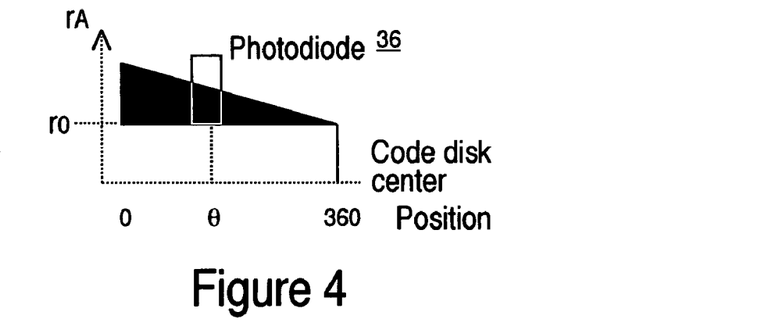
FIG. 4 illustrates the relationship between the opaque and transparent regions and angular position for the code disk of FIG. 3 according to one embodiment of the present invention.

FIG. 4 illustrates the relationship between the transparent and opaque regions 32 and 34 and the angular position of code disk 30 of FIG. 3 according to one embodiment of the present invention. In the present embodiment, as the angular position of code disk 30 increases, the area of photodiode 36 that is exposed to light increases and vice versa.

Figure 5:
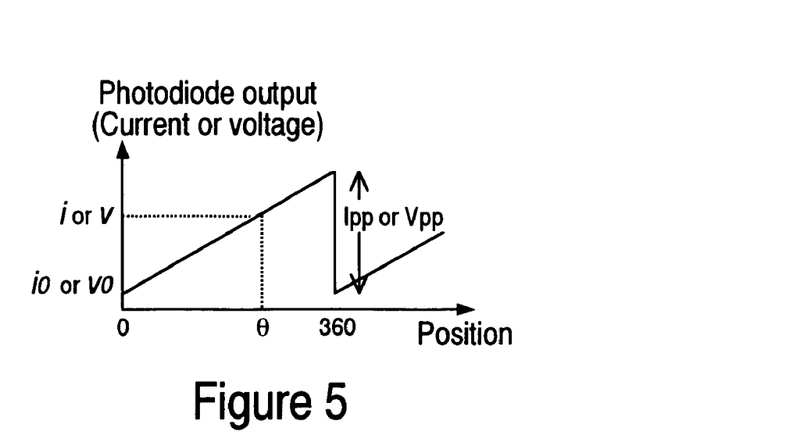
FIG. 5 illustrates the relationship between detector output and angular position for the code disk of FIG. 3 according to one embodiment of the present invention.

Photodiode 36 of FIG. 3 produces an output (e.g., a current $i_A$ or a voltage $V_A$) that is indicative of the amount of light it receives. FIG. 5 illustrates the linear relationship between the output of photodiode 36 and the angular position of code disk 30 (FIG. 3) according to one embodiment of the present invention. In FIG. 5, $i_0$ is the current at 0° (e.g., at $r_0$), $v_0$ is the voltage at 0°, $I_{pp}$ is the peak-to-peak current through one revolution of code disk 30, and $V_{pp}$ is the peak-to-peak voltage through one revolution of code disk 30.

For the case in which the output of photodiode 36 is a current $i_A$:

$$i_A = i_0 + (I_{pp}/360) \cdot \theta. \tag{3}$$

Equation (3) can be rearranged so that the angular position is written as a function of $i_A$:

$$\theta = (i_A - i_0) \cdot (360/I_{pp}). \quad (4)$$

$I_{pp}$ and $i_0$ are known, and so the angular position of the code disk 30 can be determined as a function of the value of $i_A$ using equation (4). The angular position of code disk 30 can be similarly determined using voltages instead of currents. Code disk 30 thus yields virtually an infinite number of resolutions, limited by the precision in which the outputs of the photodiodes can be or are chosen to be read.

Code disk 30 of FIG. 3 can be designed so that $i_0$ is zero. Even if so designed, a trace amount of current may still be measurable at $r_0$ (e.g., at 0°). Also, degradation of the light source 22 (FIG. 2) may occur as the light source ages, affecting the value of $I_{pp}$. Measurements of $i_0$ and $I_{pp}$ can be performed periodically or each time an optical encoder employing code disk 30 is powered on, for example. An embodiment that provides an alternative to periodic measurements of $i_0$ and $I_{pp}$ is described below in conjunction with FIGS. 6, 7 and 8.

Figure 6:
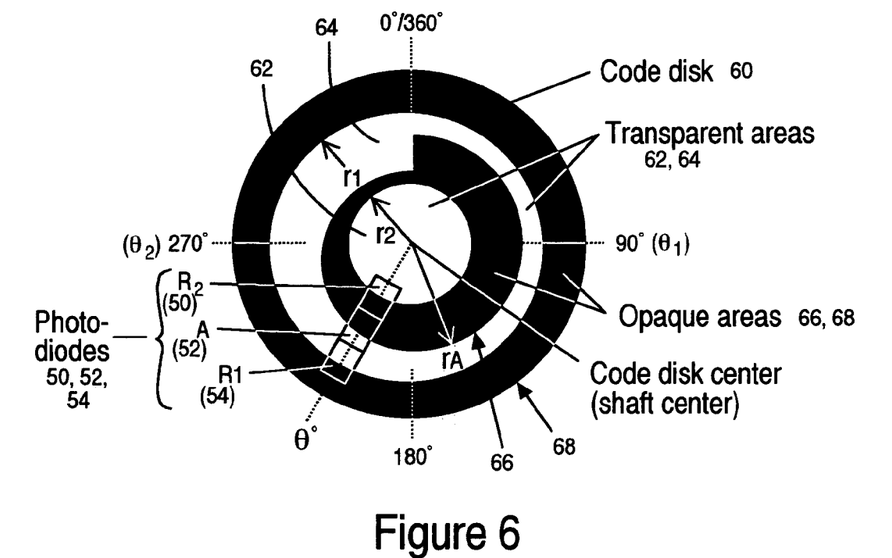
FIG. 6 illustrates a code disk with continuously scaled opaque and transparent regions according to a second embodiment of the present invention.

FIG. 6 illustrates a code disk 60 with regions 62, 64, 66 and 68 according to one embodiment of the present invention. In the present embodiment, region 62 is adjacent to region 66, and region 64 is adjacent to region 68. In one embodiment, region 62 is encompassed by region 66, and region 64 is encompassed by region 68. Regions 62 and 64 are described in FIG. 6 as being transparent, and regions 66 and 68 are described as being opaque. However, regions 62 and 64 could be opaque and regions 66 and 68 could be transparent. Also, as described above, the degree of transparency and opaqueness is not absolute. In general, regions described as transparent allow more light to be transmitted therethrough than regions described as opaque.

In the present embodiment, regions 64 and 66 are analogous to regions 32 and 34 of FIG. 3 in form and function. In one embodiment, regions 64 and 66 are continuously scaled.

Region 62 is circular in shape and has a constant radius $r_2$. Thus, region 66 has a constant inner radius also equal to $r_2$. Region 68 is ring-like in shape and has a constant inner radius of $r_1$. Thus, region 64 has a constant outer radius also equal to $r_1$.

In the embodiment of FIG. 6, three photodiodes 50, 52 and 54 are superimposed over code disk 60. The three photodiodes are each described as a single photodiode; however, the present invention is not so limited. That is, a set of photodiodes can be used in place of a single photodiode. Photodiode (R2) 50 is positioned so that it overlaps the boundary of regions 62 and 66. Photodiode (A) 52 is positioned so that it overlaps at least the boundary of regions 64 and 66. Photodiode (R1) 54 is positioned so that it overlaps at least the boundary of regions 64 and 68. As code disk 60 is rotated either clockwise or counterclockwise, more or less of photodiode 52 will be exposed to light. In contrast, the amount of light received by photodiodes 50 and 54 will be substantially constant as code disk 60 is rotated.

Figure 7:
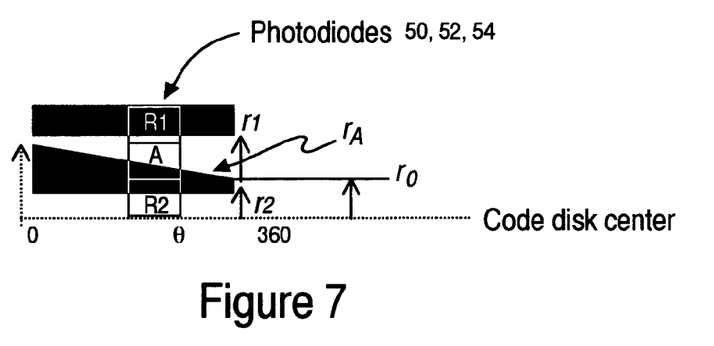
FIG. 7 illustrates the relationship between the opaque and transparent regions and angular position for the code disk of FIG. 6 according to one embodiment of the present invention.

FIG. 7 illustrates the relationship between the transparent regions 62 and 64, the opaque regions 66 and 68, and the angular position of code disk 60 of FIG. 6 according to one embodiment of the present invention. In the present embodiment, as the angular position of code disk 60 increases, the area of photodiode (A) 52 that is exposed to light increases. However, the areas of photodiodes (R2) 50 and (R1) 54 that are exposed to light remain unchanged with angular position.

Figure 8:
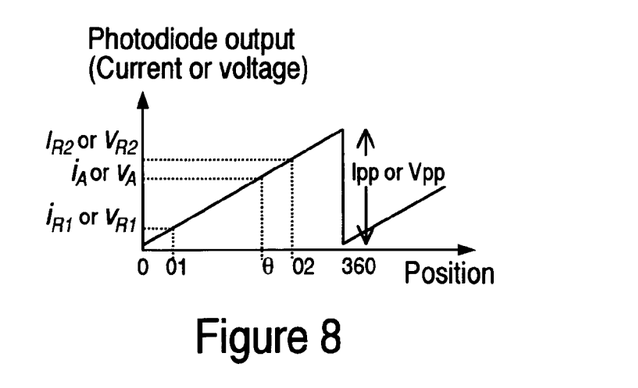
FIG. 8 illustrates the relationship between detector output and angular position for the code disk of FIG. 6 according to one embodiment of the present invention.

The output of the photodiodes 50, 52 and 54 of FIG. 6 can be a current or a voltage that is indicative of the amount of light respectively received at each of the photodiodes. FIG. 8 illustrates the linear relationship between the output of photodiodes 50, 52 and 54 and the angular position of code disk 60 (FIG. 6) according to one embodiment of the present invention. In FIG. 8, the output of photodiode 50 is referred to as $I_{R2}$ or $V_{R2}$; the output of photodiode 52 is referred to as $i_A$ or $v_A$; and the output of photodiode 54 is referred to as $I_{R1}$ or $V_{R1}$.

Although the area of photodiode 50 that is exposed to light remains constant, the magnitude of its output depends on how much of its area is exposed to light. A similar statement can be made about photodiode 54. The amount of photodiode 50 that is exposed to light depends on the value of $r_1$, and the amount of photodiode 54 that is exposed to light depends on the value of $r_2$.

Importantly, the dimension of $r_1$ is selected so that, at a first angular rotation $\theta_1$, the output of photodiode 54 (e.g., current $I_{R1}$) is equal to the output of photodiode 52 (e.g., current $i_A$). Also, the dimension of $r_2$ is selected so that, at a second angular rotation $\theta_2$, the output of photodiode 50 (e.g., current $I_{R2}$) is equal to the output of photodiode 52 (e.g., current $i_A$). That is, the dimensions of $r_1$ and $r_2$ are selected so that, at $\theta_1$, $I_{R1}=i_A$ and that, at $\theta_2$, $I_{R2}=i_A$. In the example of FIG. 6, $\theta_1=90°$ and $\theta_2=270°$. Thus, $r_1$ specified so that $I_{R1}$ and $i_A$ are equal at $\theta_1=90°$, and $r_2$ is specified so that $I_{R2}$ and $i_A$ are equal at $\theta_2=270°$. Values other than 90° and 270° can be selected for $\theta_1$ and $\theta_2$, and voltages can be used instead of currents.

Equation (5) below is derived using the linear relationship between photodiode output and angular position:

$$(I_{R2} - I_{R1})/(\theta_2 - \theta_1) = (I_{R2} - _A)/(\theta_1 - \theta). \quad (5)$$

Rearranging equation (5) yields equation (6):

$$\theta = \theta_2 - (I_{R2}i - _A) \cdot (\theta_2 - \theta_1)/(I_{R2} - I_{R1}). \quad (6)$$

Thus, the angular position of code disk 60 ($\theta$) can be calculated from equation (6). Code disk 60 thus yields virtually an infinite number of resolutions, limited by the precision in which the outputs of the photodiodes can be or are chosen to be read.

As can be seen from equation (6), the embodiment of FIG. 6 is independent from the values of $i_0$ and $I_{pp}$ that are used in the embodiment of FIG. 3. Hence, the embodiment of FIG. 6 provides robustness against any degradation of the light source. In addition, the embodiment of FIG. 6 provides robustness against potential problems with stray light.

Referring to FIGS. 3 and 6, regions 34 and 66 of code disks 30 and 60, respectively, each exhibit a discontinuity or singularity where the radius $r_A$ that defines regions 34 and 66 is equal to both its minimum and its maximum value (e.g., at the angular position 0°/360°). An embodiment that provides an alternative to the singularity at 0°/360° is described below in conjunction with FIGS. 9, 10 and 11.

Figure 9:
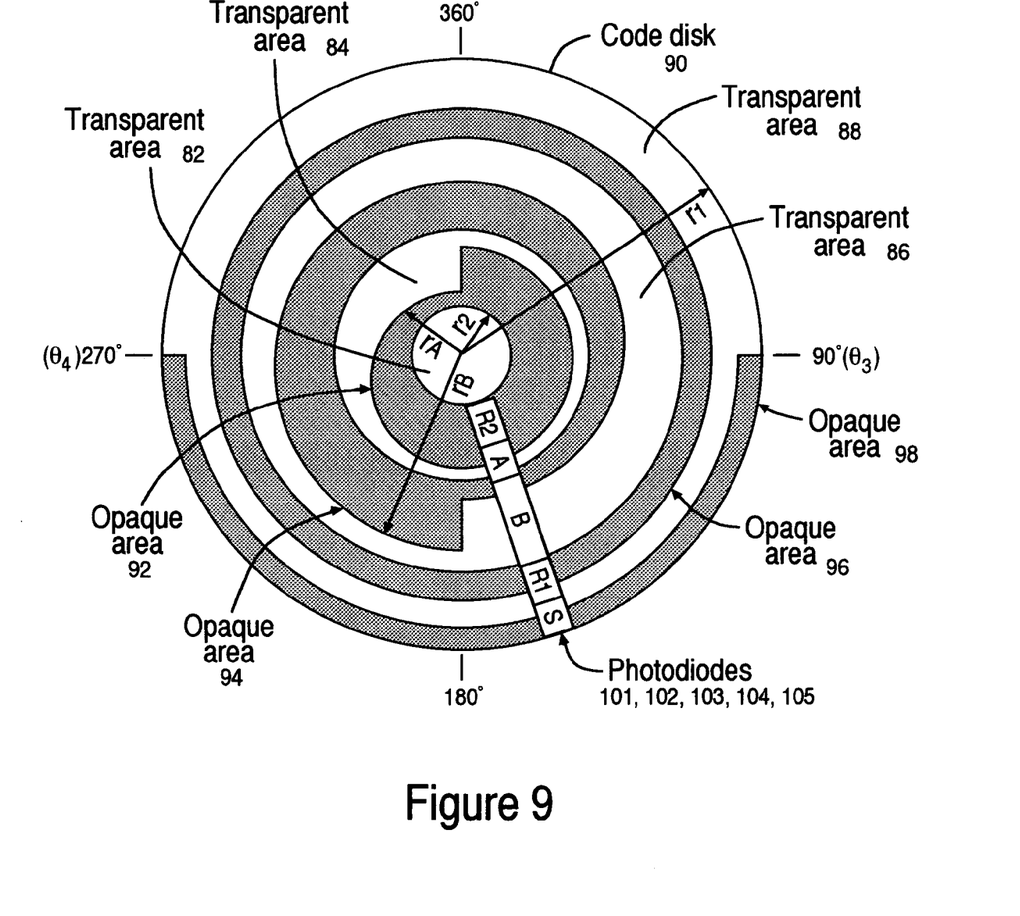
FIG. 9 illustrates a code disk with continuously scaled opaque and transparent regions according to a third embodiment of the present invention.

FIG. 9 illustrates a code disk 90 with regions 82, 84, 86, 88, 92, 94, 96 and 98 according to one embodiment of the present invention. In one embodiment, region 82 is encompassed by region 92; region 92 is encompassed by 84; region 84 is encompassed by region 94; region 94 is encompassed by region 86; region 86 is encompassed by region 96; and region 96 is encompassed by region 88. In one embodiment, regions 84, 86, 92 and 94 are continuously scaled. Although code disk 90 is illustrated and described for a particular arrangement of the 82, 84, 86, 88, 92, 94, 96 and 98, the present invention is not so limited. That is, other arrangements of these regions are possible. For example, region 98 could be between regions 94 and 96, between regions 92 and 94, or inside region 82. The functions of the various regions 82, 84, 86, 88, 92, 94, 96 and 98 will be described below, and it will be understood that those functions can be performed using different arrangements of the regions.

Regions 82, 84, 86 and 88 are described in FIG. 9 as being transparent, and regions 92, 94, 96 and 98 are described as being opaque. However, regions 82, 84, 86 and 88 could be opaque and regions 92, 94, 96 and 98 could be transparent. Also, as described above, the degree of transparency and opaqueness is not absolute. In general, regions described as transparent allow more light to be transmitted therethrough than regions described as opaque.

In the present embodiment, with reference to FIGS. 3, 6 and 9, region 84 is analogous to regions 32 and 64 and region 92 is analogous to regions 34 and 66 in form and function. In a similar manner, region 86 is also analogous to regions 32 and 64 and region 94 is also analogous to regions 34 and 66 in form and function.

The line segment $r_B$ is the radius of region 94 as a function of angular position. The length of the line segment $r_B$ increases in a linear (continuous) fashion from a minimum at a first angular position (e.g., 0°) to a maximum that is 360° from the first angular position.

Regions 84 and 92 are out of phase with regions 86 and 94. In the present embodiment, there is a phase difference of 180° between regions 84, 92 and 86, 94; however, phase differences other than 180° can be used. Importantly, by being out of phase, the discontinuity or singularity associated with regions 84, 92 and the singularity associated with regions 86, 94 are not aligned with each other.

Region 88 includes an opaque region 98 that, in one embodiment, extends halfway around code disk 90. Importantly, opaque region 98 traverses or overlaps either the singularity associated with the regions 84, 92 or the singularity associated with regions 86, 94. In the present embodiment, opaque region 98 extends from 90° to 270°, overlapping the singularity associated with regions 86, 94. Alternatively, opaque region 98 could overlap the singularity associated with regions 84, 92. Also, opaque region 98 can form an arc that is less than or more than 180°.

In the present embodiment, region 82 is circular in shape and has a constant radius $r_2$, and region 96 is ring-like in shape and has a constant inner radius of $r_1$. The dimensions of radii $r_1$ and $r_2$ are selected in a manner similar to that described above in conjunction with FIG. 6.

In the embodiment of FIG. 9, five photodiodes 101, 102, 103, 104 and 105 are superimposed onto code disk 90. The five photodiodes are each described as a single photodiode; however, the present invention is not so limited. That is, a set of photodiodes can be used in place of a single photodiode. Photodiode (R2) 101 is positioned so that it overlaps the boundary of regions 82 and 92. Photodiode (A) 102 is positioned so that it overlaps at least the boundary of regions 84 and 92. Photodiode (B) 103 is positioned so that it overlaps at least the boundary of regions 86 and 94. Photodiode (R1) 104 is positioned so that it overlaps the boundary of regions 86 and 96 (photodiode 104 could alternatively overlap the boundary of regions 88 and 96). Photodiode (S) 105 is positioned so that it overlaps region 98 at least in part.

As code disk 90 is rotated either clockwise or counterclockwise, more or less of photodiodes (A) 102 and (B) 103 will be exposed to light. Thus, the amount of light received by photodiodes (A) 102 and (B) 103 will vary as code disk 90 is rotated. The amount of light received by photodiodes (R2) 101 and (R1) 104 will be substantially constant as code disk 90 is rotated. The amount of light received by photodiode (S) 105 will be relatively constant in a first amount when photodiode (S) 105 is being traversed by region 98 and relatively constant in a second amount when photodiode (S) 105 is not being traversed by region 98.

Figure 10:
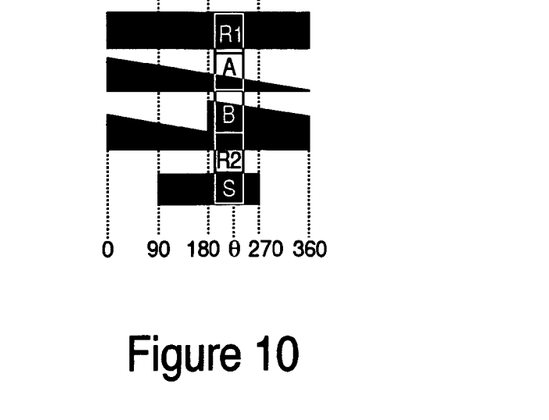
FIG. 10 illustrates the relationship between the opaque and transparent regions and angular position for the code disk of FIG. 9 according to one embodiment of the present invention.

FIG. 10 illustrates the relationship between the transparent regions 82, 84, 86 and 88, the opaque regions 92, 94, 96 and 98, and the angular position of code disk 90 of FIG. 9 according to one embodiment of the present invention. In the present embodiment, as the angular position of code disk 90 increases, the areas of photodiodes (A) 102 and (B) 103 that are exposed to light increase (although they increase out of phase). However, the areas of photodiodes (R2) 101 and (R1) 104 that are exposed to light remain unchanged with angular position. Photodiode (S) 105 will receive more light from 0° to 90° and from 270° to 360° than it will receive from 90° to 270°.

Figure 11:
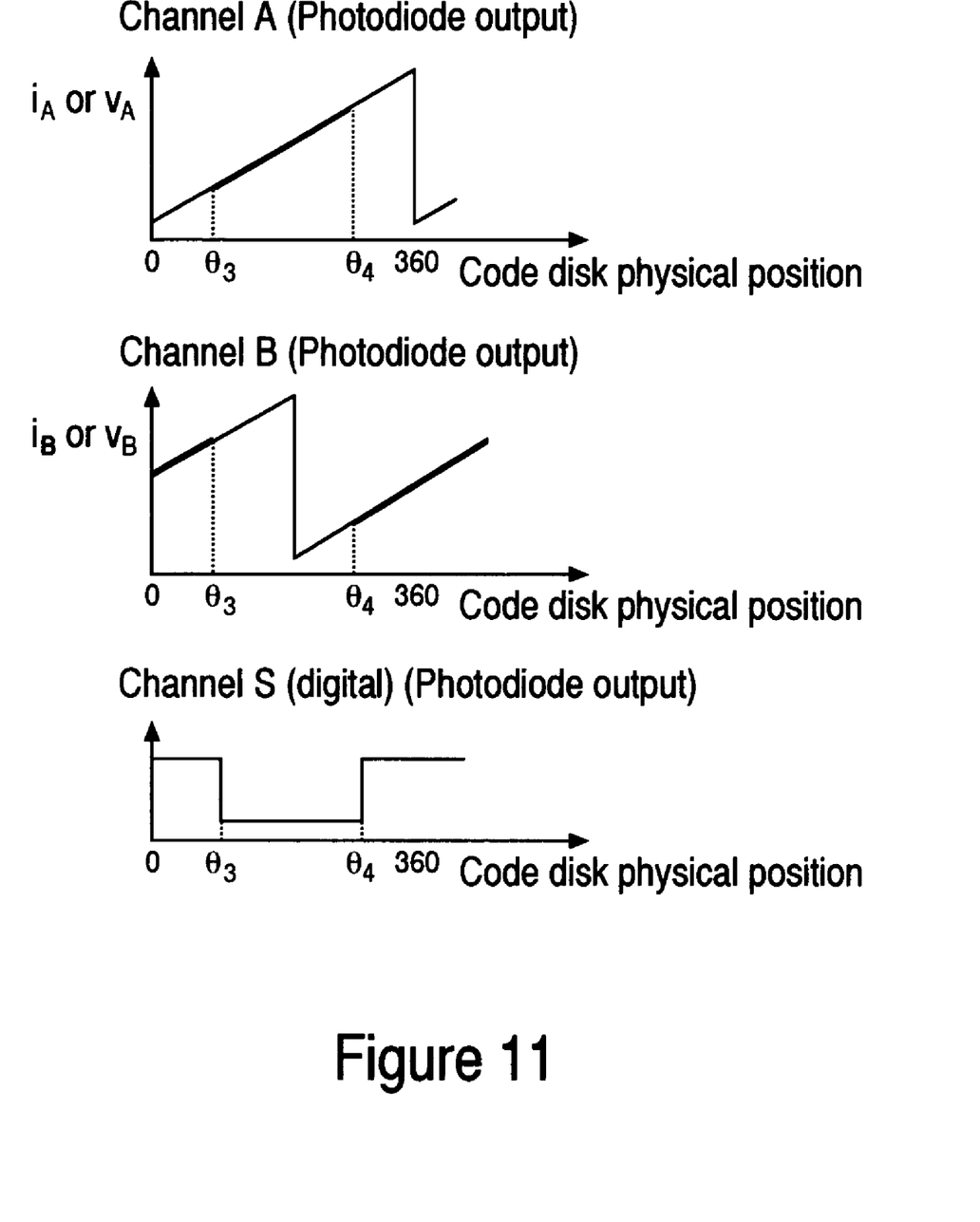
FIG. 11 illustrates the relationship between detector output and angular position for the code disk of FIG. 9 according to one embodiment of the present invention.

As described above, the output of the photodiodes 101–105 of FIG. 9 can be a current or a voltage that is indicative of the amount of light each photodiode receives. FIG. 11 illustrates the relationship between the output of photodiodes (A) 102, (B) 103 and (S) 105 and the angular position of code disk 90 (FIG. 9) according to one embodiment of the present invention. In FIG. 11, the output of photodiode (A) 102 is referred to as $i_A$ or $v_A$, and the output of photodiode (B) 103 is referred to as $i_B$ or $V_B$. There is a linear relationship between the outputs of photodiodes (A) 102 and (B) 103 and angular position. However, the relationship between the output of photodiode (S) 105 is stepwise, depending on whether or not photodiode (S) 105 is being traversed by opaque region 98.

The angles $\theta_3$ and $\theta_4$ correspond to the range of the arc defined by opaque region 98. In the present embodiment, $\theta_3=90°$ and $\theta_4=270°$. Thus, in the present embodiment, $\theta_3$ and $\theta_4$ correspond to the angular positions $\theta_1$ and $\theta_2$ selected as references as described above in conjunction with FIG. 6. However, $\theta_3$ and $\theta_4$ can be different from $\theta_1$ and $\theta_2$.

The output of photodiode (S) 105 is used to select between either the output of photodiode (A) 102 or the output of photodiode (B) 103. For example, when the output of photodiode (S) 105 is low, the output of photodiode (A) 102 is used, and when the output of photodiode (S) 105 is high, the output of photodiode (B) 103 is used. In this manner, the singularity associated with regions 84, 92 and the singularity associated with regions 86, 94 are avoided.

Thus, when the output of photodiode (S) 105 is low, then:

$$\theta=\theta_2-(I_{R2}-i_A)\cdot(\theta_2-\theta_1)/(I_{R2}-I_{R1}); \tag{7}$$

and when the output of photodiode (S) 105 is high, then:

$$\theta=\theta_2-(I_{R2}-B)\cdot(\theta_2-\theta_1)/(R_{R2}I-I_{R1})-180. \tag{8}$$

If equation (8) yields a negative value for $\theta$, then $\theta$ can be increased by 360 to yield an equivalent positive value. Code disk 90 thus yields virtually an infinite number of resolutions, limited by the precision in which the outputs of the photodiodes can be or are chosen to be read.

Thus, the angular position of code disk 90 ($\theta$) can be calculated from equations (7) and (8) depending on the output of the photodiode (S) 105. Hence, the embodiment of FIG. 9 provides robustness against any error that may be introduced by the singularity associated with the continuously scaled regions.

Furthermore, for the various code disk embodiments described herein, robustness is provided against disk placement errors and disk eccentricity. The output $\theta$ will be free from these errors as all of the outputs of a set of photodiodes will increase or decrease by the same amount should a disk placement error or disk eccentricity occur.

Figure 12:
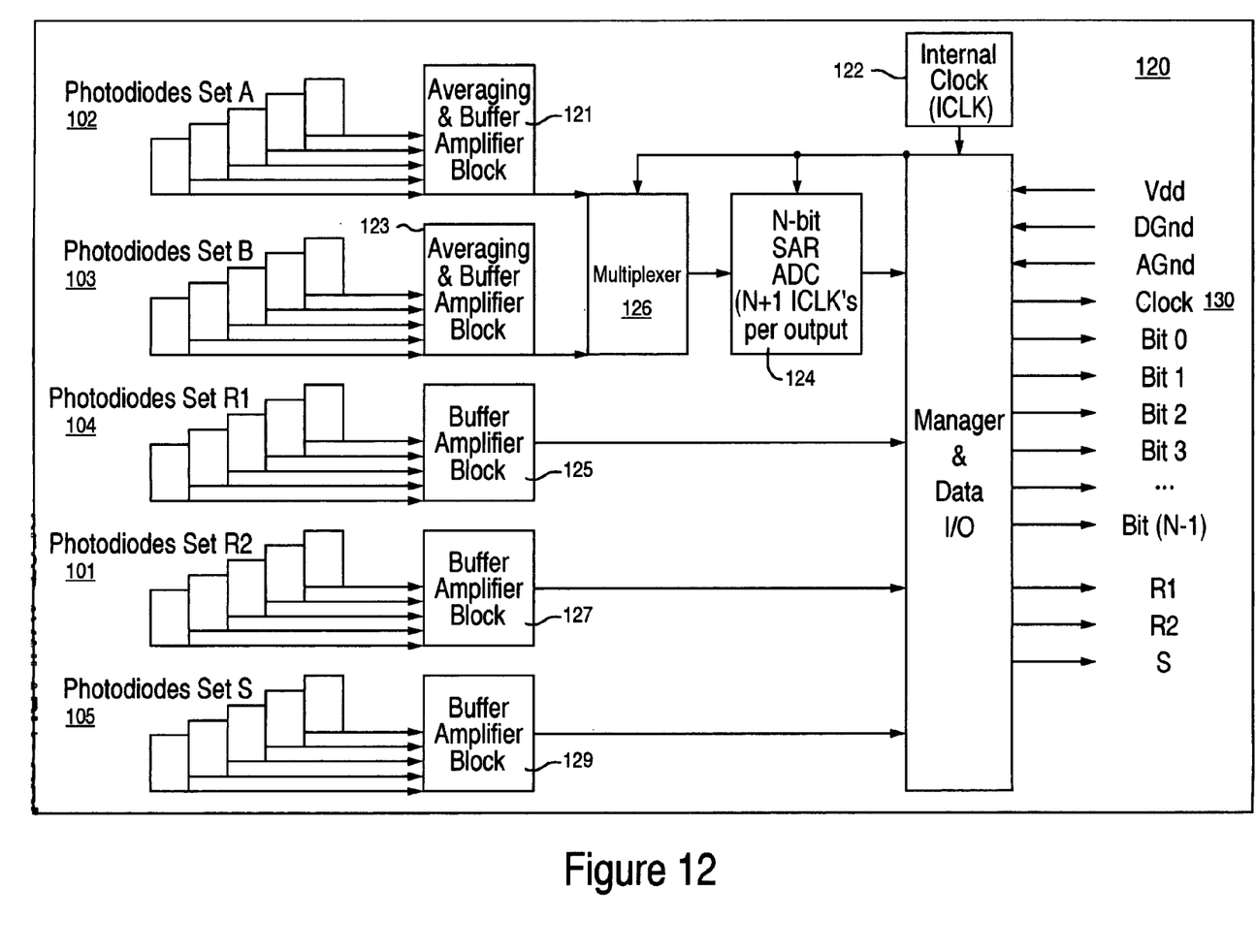
FIG. 12 is a block diagram of an integrated circuit that can be used with embodiments of an optical encoder in accordance with the present invention.

FIG. 12 is a block diagram of one example of an integrated circuit 120 that can be used with embodiments of an optical encoder in accordance with the present invention. Integrated circuit 120 is configured for an embodiment using five sets of photodiodes 101–105 with code disk 90 of FIG. 9. Each set of photodiodes can consist of one or more photodiodes to achieve an averaging effect and thus a reduction in non-linearity error. However, integrated circuit 120 can be adapted for use with a different number of photodiodes, including a single set of photodiodes associated with the use of code disk 30 of FIG. 3 and three sets of photodiodes associated with the use of code disk 60 of FIG. 6. Also, an integrated circuit using different elements, or different arrangements of the same elements, can also be used in accordance with the embodiments of the present invention.

With reference to FIG. 12, integrated circuit 120 includes signal processing circuitry for processing the outputs of the various sets of photodiodes 101–105. In one embodiment, the signal processing circuitry includes averaging and amplifier blocks 121 and 123; buffer amplifier blocks 125, 127 and 129; multiplexer 126, successive approximation register (SAR) analog-to-digital converter (ADC) 124; internal clock 122; and a manager and data input/output (I/O) block 128. In the present embodiment, an N-bit SAR ADC implementation is adopted. The external clock 130 runs N+2 times slower than the internal clock 122. In such an embodiment, N+1 internal clock cycles are used by the N-bit SAR ADC 124 for processing the signals, and the $(N+2)^{th}$ clock cycle is used by manager and data I/O block 128 for data processing. Output bit resolution can be varied by adopting a different ADC design, which may consume less internal clock cycles to produce a higher number of output bits.

In the present embodiment, integrated circuit 120 includes the photodiodes 101–105 as well as signal processing circuitry in a single package. However, it to be appreciated that photodiodes 101–105 and the signal processing circuitry do not need to be mounted in the same package.

Figure 13:
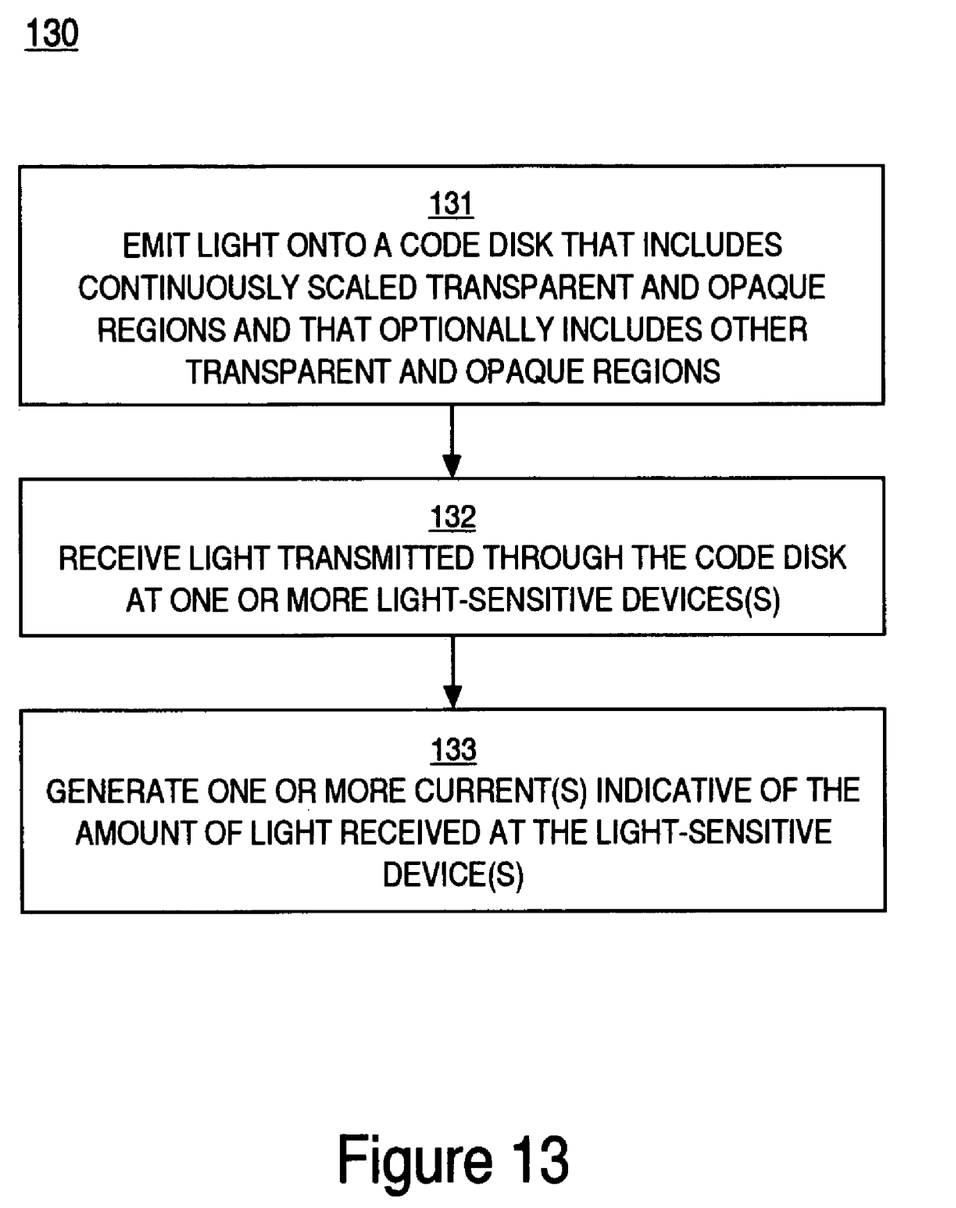
FIG. 13 is a flowchart of an optical encoding method according to one embodiment of the present invention.

FIG. 13 is a flowchart 130 of an optical encoding method according to one embodiment of the present invention. Although specific steps are disclosed in flowchart 130, such steps are exemplary. That is, embodiments of the present invention are well suited to performing various other or additional steps or variations of the steps recited in flowchart 130. It is appreciated that the steps in flowchart 130 may be performed in an order different than presented.

In step 131, in the present embodiment, light is emitted from a light source onto a code disk. The code disk includes a first region and a second region that encompasses the first region. In one embodiment, the area of the first region increases continuously in size in a radial direction from a minimum to a maximum that is 360 degrees from the minimum. One of the first and second regions is transparent or nearly so, and the other of the first and second regions is opaque or nearly so (e.g., if the first region is transparent then the second region is opaque, and vice versa).

In step 132, light that is transmitted through the first and second regions is received at a light-sensitive device. Movement of the code disk relative to the light-sensitive device exposes a different amount of the light-sensitive device to light.

In step 133, an electrical current indicative of the amount of light received at the light-sensitive device is generated. In one embodiment, the electrical current into a digital signal. The angular position of the code disk can be determined using the electrical current or the digital signal.

In one embodiment, the code disk also includes a circular-shaped third region that is encompassed by the aforementioned first region, and a ring-shaped fourth region that encompasses the aforementioned second region. If the first region is transparent, then the third region is opaque, and vice versa. If the second region is transparent, then the fourth region is opaque, and vice versa. In this embodiment, light that is transmitted through the first and third regions is received at a second light-sensitive device, and light that is transmitted through the second and fourth regions is received at a third light-sensitive device. A second electrical current indicative of an amount of light received at the second light-sensitive device can be generated, and a third electrical current indicative of an amount of light received at the third light-sensitive device can be generated. The angular position of the code disk can then be determined using the second and third electrical currents and the aforementioned first electrical current.

In another embodiment, the code disk also includes a fifth region encompassing the second region, and a sixth region encompassing the fifth region. The fifth and sixth regions are out of phase with the first and second regions. The area of the fifth region increases continuously in size in a radial direction from a minimum to a maximum that is 360 degrees from the minimum. One of the fifth and sixth regions is transparent or nearly so, and the other of the fifth and sixth regions is opaque or nearly so. In this embodiment, light that is transmitted through the fifth and sixth regions is received at a fourth light-sensitive device. Movement of the code disk relative to the fourth light-sensitive device exposes a different amount of the fourth light-sensitive device to light. A fourth electrical current indicative of an amount of light received at the fourth light-sensitive device can be generated. The angular position of the code disk can then be determined using the second electrical current, the third electrical current, and one of the first and fourth electrical currents. In one embodiment, the selection of either the first or fourth current is made using a seventh region that extends partially around the code disk. The seventh region prevents light from being transmitted to a fifth light-sensitive device. The output of the fifth light-sensitive device is used to select between the first and fourth electrical currents.

In summary, embodiments of the present invention provide a code disk, an optical encoder using such a disk and a method thereof that provide higher resolutions independent of optical radius, that are not sensitive to degradation of the light source, and that are not sensitive to disk placement error or code disk eccentricity. Higher resolutions are achieved without necessarily increasing the size of the code disk or the number of photodiodes.

Embodiments of the present invention are thus described. While the present invention has been described in particular embodiments, it should be appreciated that the present invention should not be construed as limited by such embodiments, but rather construed according to the following claims.

What is claimed is:

1. An optical encoder disk comprising:
   a disk;
   a first region on said disk, wherein said first region increases continuously in size in a radial direction from a minimum at a first angular position to a maximum that is 360 degrees from said first angular position, said first region defined by a circular first boundary and a second boundary that is continuous from said minimum to said maximum;
   a second region on said disk adjacent to and encompassing said first region, wherein one of said first and second regions allows a greater amount of light to be transmitted therethrough than the other of said first and second regions;

a circular-shaped third region encompassed by said first region, wherein one of said first and third regions allows a greater amount of light to be transmitted therethrough than the other of said first and third regions; and a ring-shaped fourth region encompassing said second region, wherein one of said second and fourth regions allows a greater amount of light to be transmitted therethrough than the other of said second and fourth regions;

wherein light transmitted through said first and second regions produces a first electrical output, light transmitted through said first and third regions produces a second electrical output, and light transmitted through said second and fourth regions produces a third electrical output, wherein said second and third outputs are reference outputs used to adjust said first output, and wherein said first, second and third outputs are used to determine an angular position of said disk.

2. The optical encoder disk of claim 1 further comprising:
a fifth region on said disk encompassing said second region; and
a sixth region on said disk encompassing said fifth region, wherein said fifth region increases continuously in size in a radial direction from a minimum at a second angular position to a maximum that is 360 degrees from said second angular position, and wherein one of said fifth and sixth regions allows a greater amount of light to be transmitted therethrough than the other of said fifth and sixth regions, said fifth and sixth regions out of phase with said first and second regions.

3. The optical encoder disk of claim 2 wherein said first angular position and said second angular position are different.

4. The optical encoder disk of claim 2 further comprising a seventh region that extends partially around said disk, said seventh region in a position that traverses said minimum and maximum of said first region, wherein said seventh region prevents light from being transmitted therethrough.

5. The optical encoder disk of claim 2 further comprising a seventh region that extends partially around said disk, said seventh region in a position that traverses said minimum and maximum of said fifth region, wherein said seventh region prevents light from being transmitted therethrough.

6. An optical encoder comprising:
a light source;
a code disk positioned between said light source and a light-sensitive detector, said code disk comprising:
a first region and a second region adjacent to said first region, wherein said first region increases continuously in size in proportion to angular disk position over a 360-degree arc, wherein said first region is defined by a circular first boundary and a second boundary that is continuous over said 360-degree arc, wherein one of said first and second regions allows light to be transmitted to said detector and the other of said first and second regions prevents light from being transmitted to said detector, and wherein movement of said encoder disk relative to said detector exposes a different amount of said detector to light;
a circular-shaped third region encompassed by said first region, said third region having a constant outer radius, wherein one of said first and third regions allows light to be transmitted to said detector and the other of said first and third regions prevents light from being transmitted to said detector; and
a ring-shaped fourth region encompassing said second region, said fourth region having a constant inner radius, wherein one of said second and fourth regions allows light to be transmitted to said detector and the other of said second and fourth regions prevents light from being transmitted to said detector;

wherein said detector comprises a first photodiode that straddles said first and second regions, a second photodiode that straddles said first and third regions, and a third photodiode that straddles said second and fourth regions, wherein said outer radius of said third region is dimensioned such that the outputs of said third and second photodiodes are equal at a first angular position to provide a first reference output, wherein said inner radius of said fourth region is dimensioned such that the outputs of said first and second photodiodes are equal at a second annular position to provide a second reference output, and wherein said first and second reference outputs are used with an output of said first photodiode to determine an angular position of said disk.

7. The optical encoder of claim 6 wherein said second region encompasses said first region.

8. The optical encoder of claim 6 further comprising an electronic circuit coupled to said detector, said electronic circuit converting an output of said detector into a digital signal.

9. The optical encoder of claim 6 wherein said code disk further comprises:
a fifth region encompassing said second region; and
a sixth region encompassing said fifth region, wherein the area of said first region increases continuously in size in proportion to angular disk position over a 360-degree arc, and wherein one of said fifth and sixth regions allows light to be transmitted to said detector and the other of said fifth and sixth regions prevents light from being transmitted to said detector, said fifth and sixth regions out of phase with said first and second regions.

10. The optical encoder of claim 9 wherein said first and second regions are 180 degrees out of phase with respect to said fifth and sixth regions.

11. The optical encoder of claim 9 wherein said code disk further comprises a seventh region that extends partially around said code disk, said seventh region in a position that traverses the minimum and maximum of said first region, wherein said seventh region prevents light from being to said detector.

12. The optical encoder of claim 9 wherein said code disk further comprises a seventh region that extends partially around said code disk, said seventh region in a position that traverses the minimum and maximum of said fifth region, wherein said seventh region prevents light from being transmitted to said detector.

13. The optical encoder of claim 9 wherein said detector further comprises a fourth photodiode that receives light that is transmitted through said fifth and sixth regions, and a fifth photodiode that receives light that is transmitted through a seventh region that extends partially around said code disk.

* * * * *